Jan. 7, 1969    F. H. WITT    3,420,563
FISH HOLDER
Filed Jan. 3, 1967
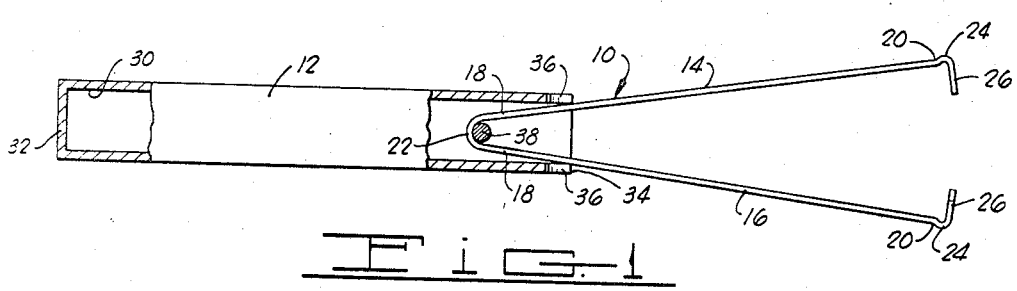
Fig. 1
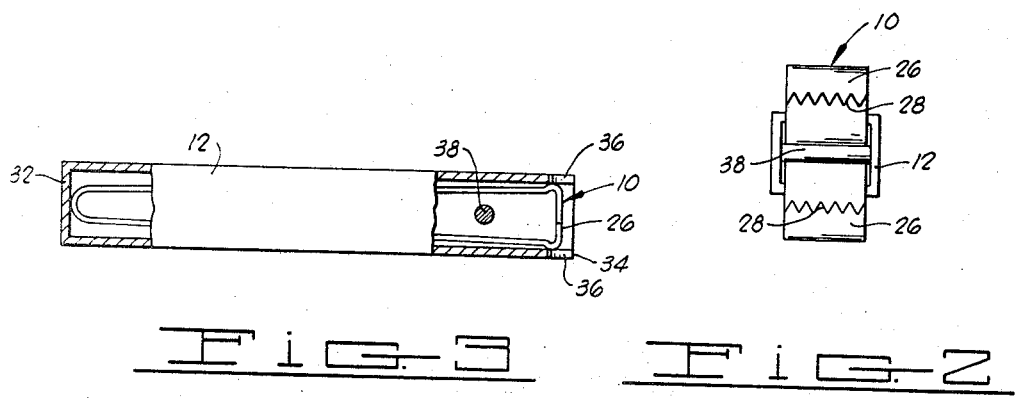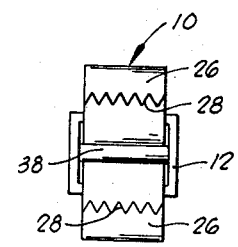
Fig. 3    Fig. 2
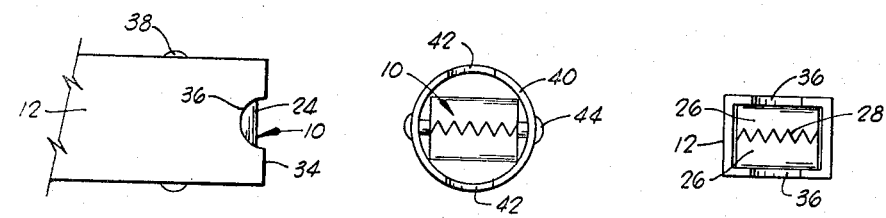
Fig. 5  Fig. 6  Fig. 4
INVENTOR.
FRED H. WITT
BY
Dunlap and Laney
ATTORNEYS

3,420,563
FISH HOLDER
Fred H. Witt, 3400 NW. 24, Oklahoma City, Okla. 73107
Filed Jan. 3, 1967, Ser. No. 606,949
U.S. Cl. 294—16     5 Claims
Int. Cl. A22b 25/08; B65g 7/12

ABSTRACT OF THE DISCLOSURE

A device for holding a fish being cleaned utilizing tongs extending into a hollow handle, wherein the tongs are pulled substantially out of the handle to grip a fish and are telescoped completely into the handle for storage, and wherein the tongs are held in both their storage and operative positions by the frictional engagement between the tongs and the interior of the handle.

BACKGROUND OF THE INVENTION

Field of the invention

This invention relates to improvements in devices for holding fish, as during cleaning of the fish.

Description of the prior art

It is well known in the art to use tongs for gripping and handling fish, such as when the fish are being cleaned. Such tongs are invariably biased to an open position, either by a separate spring or by a resilient section interconnecting the arms of the tongs. Heretofore, it has been necessary for the user to maintain a tight grip on the tongs to continually force the arms of the tongs toward one another in order to hold the fish during the cleaning operation or the like.

The prior art also discloses tong or tweezer-like devices at least partially telescoped into a hollow houing or handle, but such devices have invariably included the use of a spring continually pulling the tweezers or tongs into the housing. The use of such a spring makes it difficult to extend the tongs or tweezers from the housing, and unduly complicates (and hence increases the cost) of the complete device.

Summary of the invention

The present invention contemplates a novel fish holding device comprising tongs continually biased to an open position and having at least one raised bead on the outer surface of the end thereof containing the tong teeth, in combination with a hollow handle into which the tongs are partially telescoped during operation and into which the tongs are completely telescoped during storage. The tongs are held in the desired partial or fully extended position solely by the frictional engagement between the tongs and the inner walls of the handle. In use, the user grips the raised bead to pull the tongs substantially out of the handle and the teeth on the tongs are placed on the opposite sides of the fish to be held; whereupon the user simply wedges or forces the handle up over the tongs as far as possible to bring the teeth into gripping engagement with the fish, at which time the tongs are rigidly held in gripping position by the handle.

An object of the invention is to provide a simply constructed fish holder which may be economically manufactured.

Another object of the invention is to provide a fish holder which may be easily cleaned after use.

A further object of the invention is to provide a fish holder utilizing fish gripping tongs which may be easily extended from a cooperating handle for use.

A still further object of the invention is to provide a fish holder which will remain in gripping engagement with the fish without the necessity of the user of the device continually forcing the tongs of the device into gripping engagement with the fish.

Other objects and advantages of the invention will be evident from the following detailed description when read in conjunction with the accompanying drawings which illustrate the invention.

Brief description of the drawing

FIG. 1 is a side view of a fish holder constructed in accordance with this invention illustrating the tongs in a fully extended position and with the ends of the handle shown in section to illustrate details of construction.

FIG. 2 is an end view of the fish holder as shown in FIG. 1.

FIG. 3 is a side view of the FIG. 1 fish holder illustrating the tongs in storage position and with an end portion of the handle being shown in section to illustrate details of construction.

FIG. 4 is an end view of the fish holder as shown in the FIG. 3 position.

FIG. 5 is a partial top view of the fish holder of FIGS. 1–4 when the fish holder is in a storage position.

FIG. 6 is an end view of a modified fish holder.

Description of the preferred embodiments

The fish holder of this invention as shown in FIGS. 1–5 comprises tongs 10 and a cooperating housing or handle 12. The tongs 10 are preferably formed out of an elongated strip of resilient sheet metal, such as steel, bent to form elongated superimposed arm portions 14 and 16 having first ends 18 and second ends 20. The first ends 18 of the arm portions 14 and 16 are interconnected by a U-shaped resilient portion 22 which continually biases the second ends 20 of the arms apart.

The second end 20 of each of the arms 14 and 16 is first bent outwardly to form a raised bead 24 on the outer surface thereof, and is then bent inwardly toward the opposite arm to form a gripping portion 26. It will thus be seen that the raised beads 24 extend transversely across the respective arms 14 and 16 opposite to the gripping portions 26, and it will be apparent that the beads 24 may be formed or provided in other ways, such as by the application of welding material to the ends 20 of the arms. It will also be observed in FIG. 1 of the drawing that each gripping portion 26 is extended at approximately ninety degrees to the respective arm 14 or 16, such that the gripping portions 26 will be vertically aligned when the arms 14 and 16 are forced together with the device oriented as shown in FIG. 1.

Serrations 28 are provided on the inner end of each gripping portion 26 to form teeth which will dig into the surface of a fish as will be hereinafter described. It should also be noted in FIG. 4 that the serrations or teeth 28 are formed to mesh when the arms 14 and 16 are forced together.

The handle 12 is hollow to provide a chamber 30 therein, and one end 32 thereof is closed while the opposite end 34 is open. In the preferred form of the invention, the handle 12 is rectangular in cross section and the width of the chamber 30 is only slightly greater than the width of the tongs 10, such that the tongs 10 may be telescoped in and out of the handle 12, but the tongs will be closely received in the handle. It may also be noted that the height of the chamber 30 is substantially equal to the height of the tongs 10 when the arms 14 and 16 are forced toward one another and the teeth 28 are meshed together as shown in FIG. 4.

Diametrically opposed slots 36 are provided in the top and bottom of the handle 12 at the open end 34 thereof, such that the user of the device may grip the raised beads 24 when the tongs 10 are completely telescoped in the handle 12 to facilitate the extension of the tongs from the handle. In this regard, it should be noted that the length of the handle 12 is slightly greater than the length of the tongs 10, such that the tongs 10 may be completely telescoped into the handle.

A pin 38 is secured transversely in the handle 12 across the chamber 30 adjacent the open end 34 of the handle and extends between the arm portions 14 and 16 of the tongs 10, such that the U-shaped portion 22 of the tongs will contact the pin 38 when the tongs are being extended from the handle to prevent the complete removal of the tongs from the handle.

As previously indicated, in the storage position of the fish holder, the tongs 10 are completely telescoped into the handle 12 as illustrated in FIG. 3. In this position, the teeth 28 will be completely meshed and will be disposed within the open end 34 of the handle 12 to prevent the teeth from inadvertently snagging or engaging the user's clothing or other equipment.

In order to hold a fish with the device, the user extends two fingers through the slots 36 in the open end 34 of the handle 12 and grips the raised beads 24, whereby the user manually pulls the tongs 10 out of the handle until the end 22 of the tongs engages the pin 38. The gripping portions 26 of the tongs are then placed on opposite sides of the fish to be held and the arms 14 and 16 are manually forced toward one another until the teeth 28 are tightly engaged with the opposite surfaces of the fish. The handle 12 is thereupon forced or wedged over the tongs 10 by the user until the lengthwise movement of the handle 12 is stopped through tight engagement between the arms 14 and 16 and the adjacent surfaces of the open end 34 of the handle. The handle 12 will then be tightly, frictionally engaged with the tongs 10 to hold the gripping portions 26 of the tongs in tight engagement with the fish. The user can then manipulate the fish in any desired direction, as for cleaning.

When the fish is cleaned, the handle 12 is slipped back off of the tongs 10 until the pin 38 engages the end 22 of the tongs; whereupon the gripping portions 26 of the tongs will be automatically released from the fish. The device is then normally cleaned simply by rinsing with water, and the tongs 10 are forced back into the handle 12 to the position shown in FIG. 3. In this position of the tongs 10, the tongs will be firmly held in the handle 12 by the frictional engagement between the raised beads 24 and the adjacent surfaces of the handle 12.

As shown in FIG. 6, instead of a rectangularly cross-sectioned handle as previously described, the fish holder of this invention may employ a handle 40 which is circular in cross section for economy of manufacture. The handle 40 is of a length equal to the length of the handle 12 previously described and has one open end and one closed end in the same manner as the handle 12. Further, diametrically opposed slots 42 are provided in the open end of the handle 40 corresponding to the slots 36 previously described in connection with the handle 12.

The inner diameter of the handle 40 is slightly greater than the width of the tongs 10, such that the tongs 10 may be easily telescoped into and out of the handle 40. However, the inner diameter of the handle 40 is preferably sized such that the corners of the tongs 10 fit closely adjacent the inner surface of the handle 40 as illustrated in FIG. 6. As indicated, the modified fish holder shown in FIG. 6 utilizes the tongs 10 previously described and, further, a pin 44 is secured transversely across the handle 40 to perform the function of the pin 38 described in connection with the embodiment shown in FIGS. 1–5.

From the foregoing, it will be apparent that the present invention provides a simply constructed fish holder which may be economically manufactured. The holder of this invention employs tongs which may be easily removed from the cooperating handle for use in gripping a fish, and the tongs will be held in gripping engagement with the fish by the frictional engagement between the handle and the tongs when the handle is wedged up over the tongs. It will also be apparent that the present fish holder may be easily cleaned and may be stored without the possibility of damage to the user's clothing or other equipment.

Changes may be made in the combination or arrangement of parts or elements as heretofore set forth in the specification and shown in the drawings, it being understood that changes may be made in the embodiments disclosed without departing from the spirit and scope of the invention as defined in the following claims.

What is claimed is:

1. A fish holder, comprising:
   fish gripping tongs, comprising:
   a pair of superimposed, elongated arms having first and second ends;
   a resilient U-shaped portion interconnecting the first ends of the arms and biasing the second ends of the arms apart;
   teeth on the second end of each arm extending toward the opposite arm for gripping a fish therebetween, said teeth being arranged to mesh when the arms are forced toward one another; and
   a raised bead on the second end of each of the arms on the surface thereof opposite to the respective teeth to facilitate the manual lengthwise movement of the tongs; and
   an elongated, hollow handle having a length at least as great as the length of the tongs and being internally sized to be completely telescoped over the tongs when the tongs are to be stored, partially telescoped over the tongs to wedge the teeth of the tongs into a tight grip on a fish when the fish is extended between said teeth, and frictionally hold the tongs in a fixed lengthwise position with respect to the handle, said handle being closed at one end and open at the other end, diametrically opposed slots in the open end of the handle to facilitate the manual gripping of the tongs when the tongs are completely telescoped into the handle; and
   a pin secured transversely through the handle adjacent the open end thereof between the arms of the tongs to prevent complete removal of the tongs from the handle.

2. A fish holder as defined in claim 1 wherein said tongs are formed of an elongated strip of resilient sheet metal, and the second ends of said arms are bent toward one another and serrated to provide said teeth.

3. A fish holder as defined in claim 2 wherein said beads are formed on the second end of each of said arms, and wherein said beads are formed by bending said sheet metal outwardly and then inwardly at the second end of each of said arms.

4. A fish holder as defined in claim 1 wherein said handle is rectangular in cross section and the internal width thereof is substantially equal to the width of the tongs.

5. A fish holder as defined in claim 1 wherein said handle is circular in cross section.

References Cited
UNITED STATES PATENTS

| | | | |
|---|---|---|---|
| 987,173 | 3/1911 | Sale | 81—43 |
| 1,419,591 | 6/1922 | Stollerman | 294—33 |
| 2,768,856 | 10/1956 | Wright | 294—33 X |

EVON C. BLUNK, *Primary Examiner.*

M. L. AJEMAN, *Assistant Examiner.*

U.S. Cl. X.R.

81—43; 294—33, 100